(12) United States Patent
Leibovits et al.

(10) Patent No.: US 12,711,403 B2
(45) Date of Patent: Aug. 18, 2026

(54) METHOD AND SYSTEM FOR DYNAMIC LATENT VECTOR ALLOCATION

(71) Applicant: YAHOO ASSETS LLC, Dulles, VA (US)

(72) Inventors: Rina Leibovits, Haifa (IL); Oren Somekh, Cfar-Neter (IL); Yohay Kaplan, Haifa (IL); Yair Koren, Zichron Yaacov (IL)

(73) Assignee: YAHOO ASSETS LLC, Dulles (VA)

(*) Notice: Subject to any disclaimer, the term of this patent is extended or adjusted under 35 U.S.C. 154(b) by 548 days.

(21) Appl. No.: 16/919,690

(22) Filed: Jul. 2, 2020

(65) Prior Publication Data

US 2022/0004896 A1 Jan. 6, 2022

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS 10,943,181 B2* 3/2021 Shteingart .............. G06N 20/00
2019/0095716 A1* 3/2019 Shrestha .............. G08B 21/187
2021/0286945 A1* 9/2021 Nagar ...................... G06N 3/04

OTHER PUBLICATIONS

Lee, et al., Anomaly Detection via Online Oversampling Principal Component Analysis, IEEE Transactions on Knowledge and Data Engineering, vol. 25, Jul. 2013, pp. 1-11 (Year: 2013).*
Leal Narváez, et al., Point Cloud Denoising Using Robust Principal Component Analysis, Proceedings of the First International Conference on Computer Graphics Theory and Applications, 2006, pp. 1-9 (Year: 2006).*
Kumar et al., "Extraction of Informative Regions of a Face for Facial Expression Recognition," in 10.6 IET Computer Vision 567-76 (2016). (Year: 2016).*

* cited by examiner

*Primary Examiner* — Ryan C Vaughn
(74) *Attorney, Agent, or Firm* — Venable LLP

(57) ABSTRACT

The present teaching relates to method, system, and computer programming product for dynamic vector allocation. Machine learning is conducted using training data constructed based on a target vector having a plurality of feature entries, wherein each of the plurality of feature entries is mapped from at least one original attribute from one or more original source vectors. A feature entry in the target vector is identified based on a first criterion associated with an assessment of the machine learning, for replacing the corresponding at least one original attribute from the one or more original source vectors. At least one alternative attribute from alternative source vectors based on a second criterion is determined, wherein the at least one alternative attribute is to be mapped to the feature entry of the target vector. The feature entry of the target vector is populated based on the at least one alternative attribute.

20 Claims, 13 Drawing Sheets

METHOD AND SYSTEM FOR DYNAMIC LATENT VECTOR ALLOCATION

BACKGROUND

1. Technical Field

The present teaching generally relates to data processing. More specifically, the present teaching relates to a method and system for performance based dynamic vector construction.

2. Technical Background

In the age of the Internet, the amount of data available becomes explosive. Great effort has been made to analyze the vast amount of data in order to improve the efficiency associated with data access. Retrieval and processing of large data sets has always been a subject of research as data sets grow in size and complexity.

Typically, optimization frameworks and machine-learned methodologies represent certain features as vectors. For instance, a vector may be generated for each user by combining vectors of individual user features e.g., age, gender, geo-location, etc. As depicted in FIG. 1 (prior art), fixed size user feature vectors 110 e.g., age 110*a*, gender 110*b*, and geo-location 110*c* are mapped via a target vector generator 120 to generate a target vector 130. Specifically, the target vector generator 120 includes a static function mapping unit that maps user feature vector entries to respective entries of the target vector 130.

Each entry of the target vector 130 may be a function of one or more user features. However, each entry of a user feature vector is mapped to a single entry of the target vector. The target vector generator 120 does not distinguish between different user features, i.e., each of the user feature vectors 110 is considered to be equally important. However, in practice, not all user features are equal, i.e., hold the same informative value. Therefore, when constructing the target vector, it is important to divide the space carefully between the different user features.

Accordingly, there is a requirement for a performance based dynamic target vector construction technique which provides an efficient representation of the user and is more adaptive to changes.

SUMMARY

The teachings disclosed herein relate to methods, systems, and programming for data processing. More specifically, the present teaching relates to techniques for performance based dynamic target vector construction.

One aspect of the present disclosure provides for a method, implemented on a machine having at least one processor, storage, and a communication platform capable of connecting to a network for performance based dynamic vector construction. The method comprises the steps of: conducting machine learning using training data constructed based on a target vector having a plurality of feature entries, wherein each of the plurality of feature entries is mapped from at least one original attribute from one or more original source vectors; identifying a feature entry in the target vector, in accordance with a first criterion associated with an assessment of the machine learning, for replacing the corresponding at least one original attribute from the one or more original source vectors; determining at least one alternative attribute from one or more alternative source vectors based on a second criterion, wherein the at least one alternative attribute is to be mapped to the feature entry of the target vector; and populating the feature entry of the target vector based on the at least one alternative attribute.

By one aspect of the present disclosure, there is provided a system for performance based dynamic vector construction. The system comprises: a training engine implemented by a processor and configured to conduct machine learning using training data constructed based on a target vector having a plurality of feature entries, wherein each of the plurality of feature entries is mapped from at least one original attribute from one or more original source vectors; a feature vector entry removal unit implemented by the processor and configured to identify a feature entry in the target vector, in accordance with a first criterion associated with an assessment of the machine learning, for replacing the corresponding at least one original attribute from the one or more original source vectors; a feature vector entry adding unit implemented by the processor and configured to determine at least one alternative attribute from one or more alternative source vectors based on a second criterion, wherein the at least one alternative attribute is to be mapped to the feature entry of the target vector; and a reallocation unit implemented by the processor and configured to populate the feature entry of the target vector based on the at least one alternative attribute.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a machine-readable, non-transitory and tangible medium having data recorded thereon for performance based dynamic vector construction, wherein the information, when read by a machine, causes the machine to perform the steps of: conducting machine learning using training data constructed based on a target vector having a plurality of feature entries, wherein each of the plurality of feature entries is mapped from at least one original attribute from one or more original source vectors; identifying a feature entry in the target vector, in accordance with a first criterion associated with an assessment of the machine learning, for replacing the corresponding at least one original attribute from the one or more original source vectors; determining at least one alternative attribute from one or more alternative source vectors based on a second criterion, wherein the at least one alternative attribute is to be mapped to the feature entry of the target vector; and populating the feature entry of the target vector based on the at least one alternative attribute.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
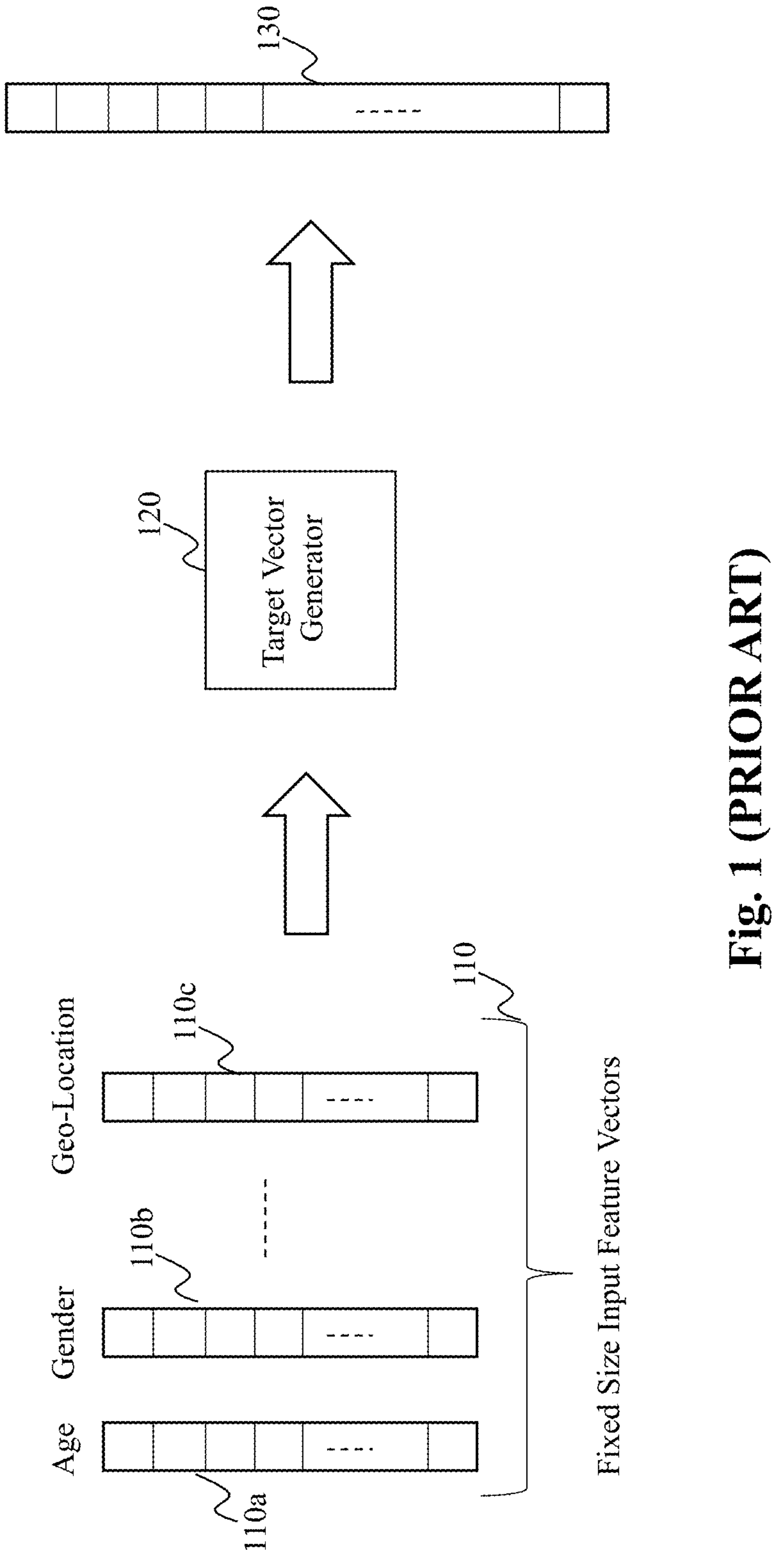
FIG. 1 (PRIOR ART) depicts a mechanism of generating a target vector.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 2:
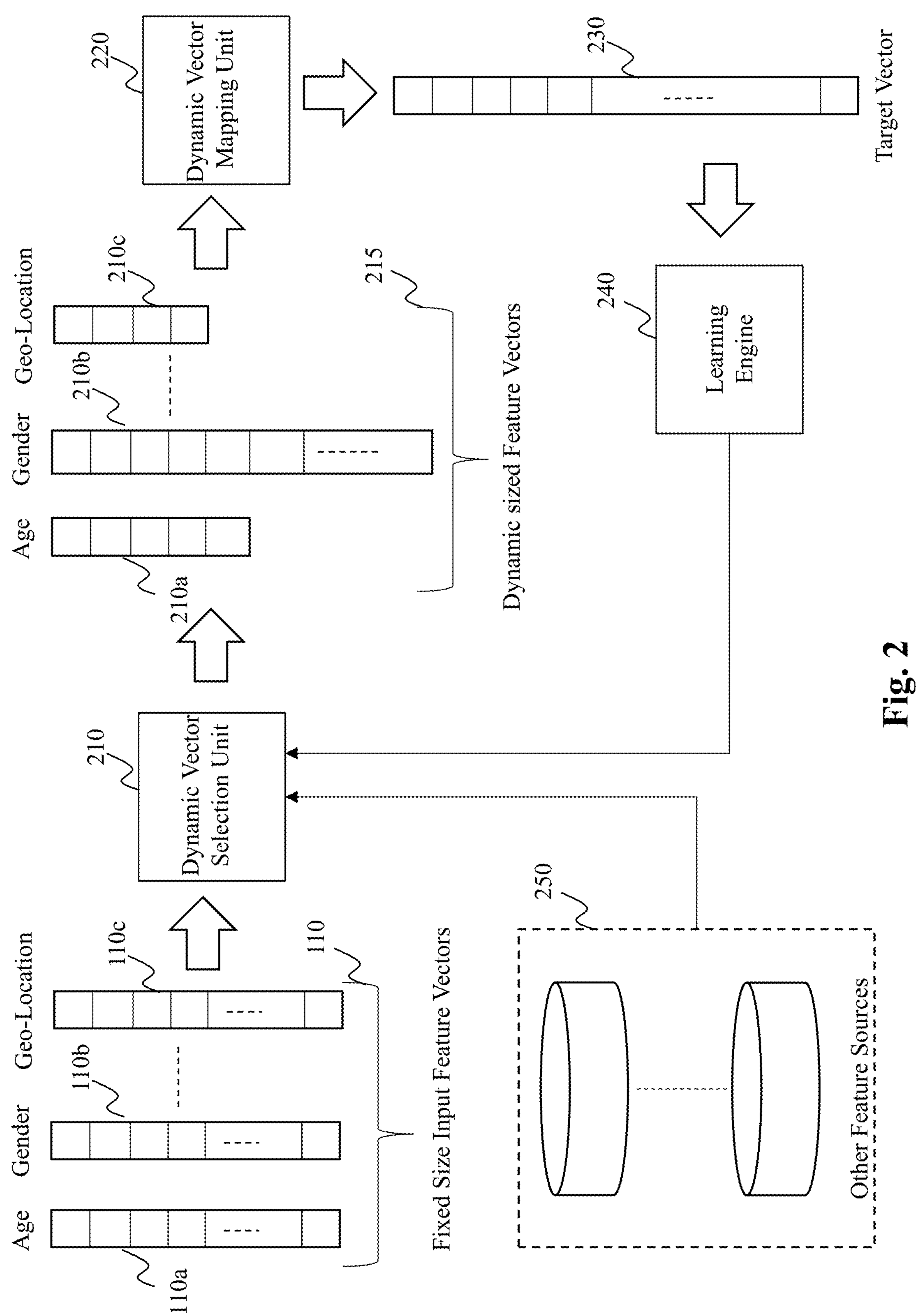
FIG. 2 depicts a mechanism of generating a target vector, according to an embodiment of the present teaching.

Turning to FIG. 2, there is depicted a mechanism of dynamically constructing a target vector, according to an embodiment of the present teaching. As shown in FIG. 2, a dynamic vector selection unit 210 and a dynamic vector mapping unit 220 are configured to dynamically construct the target vector 230. Specifically, the learning engine 240 conducts machine learning using training data constructed based on the target vector 230 having a plurality of feature entries. Each of the plurality of feature entries is mapped from at least one original attribute from one or more original source vectors i.e., input feature vectors 110. During training, the learning engine 240 processes the target vector 230 to determine which feature entry of the target vector 230 is to be modified. Details regarding the mechanism used to determine the feature entry of the target vector to be modified are described later with respect to FIG. 4. In the remainder of the present disclosure, the terms 'feature vector' and 'original source vector' are used interchangeably and correspond to the input feature vectors 110.

Upon determining the feature entry of the target vector 230 to be modified, the corresponding at least one original attribute from the one or more original source vectors mapped to the feature entry may be obtained. The dynamic vector selection unit 210 further determines at least one alternative attribute from one or more alternative source vectors based on a condition, wherein the at least one alternative attribute is to be mapped to the feature entry of the target vector 230. It must be appreciated that the alternative attribute may be obtained from the pool of original source vectors or other source vectors. Specifically, the alternative attribute may be obtained from other feature sources 250.

In this manner, the dynamic vector selection unit 210 modifies the sizes of the source vectors i.e., input feature vectors that are to be mapped to the target vector. In other words, as shown in FIG. 2, the dynamic vector selection unit 210 modifies the sizes of the input feature vectors, wherein feature vectors which hold more informative value are given more importance as opposed to feature vectors which do not hold informative value. For example, as shown in FIG. 2 (and in contrast to the mechanism of FIG. 1, which utilizes fixed sized source vectors), the dynamic vector selection unit 210 dynamically increases the size of the gender feature vector and reduces the sizes of the age and geo-location feature vectors, that are mapped to the target vector 230.

The dynamic vector mapping unit 220 utilizes a mapping function to map attributes of the dynamic sized source vectors 215 to the target vector 230. By one embodiment of the present disclosure, the dynamic vector mapping unit 220 utilizes a non-static mapping function to map the entries of the dynamic sized feature vectors 215 to the target vector 230. More specifically, during training, the dynamic vector selection unit 210 and the dynamic vector mapping unit 220 in combination, provide the flexibility of changing the sizes of the input feature vectors and may further also provide the flexibility of modifying the mapping function over the course of the training period. The details pertaining to the addition and removal of attributes of source vectors that are to be mapped to the target vector are described later with reference to FIG. 4. Moreover, for the sake of simplicity, the combination of the dynamic vector selection unit 210 and the dynamic vector mapping unit 220 is hereinafter referred to as a dynamic vector allocation unit.

Figure 3:
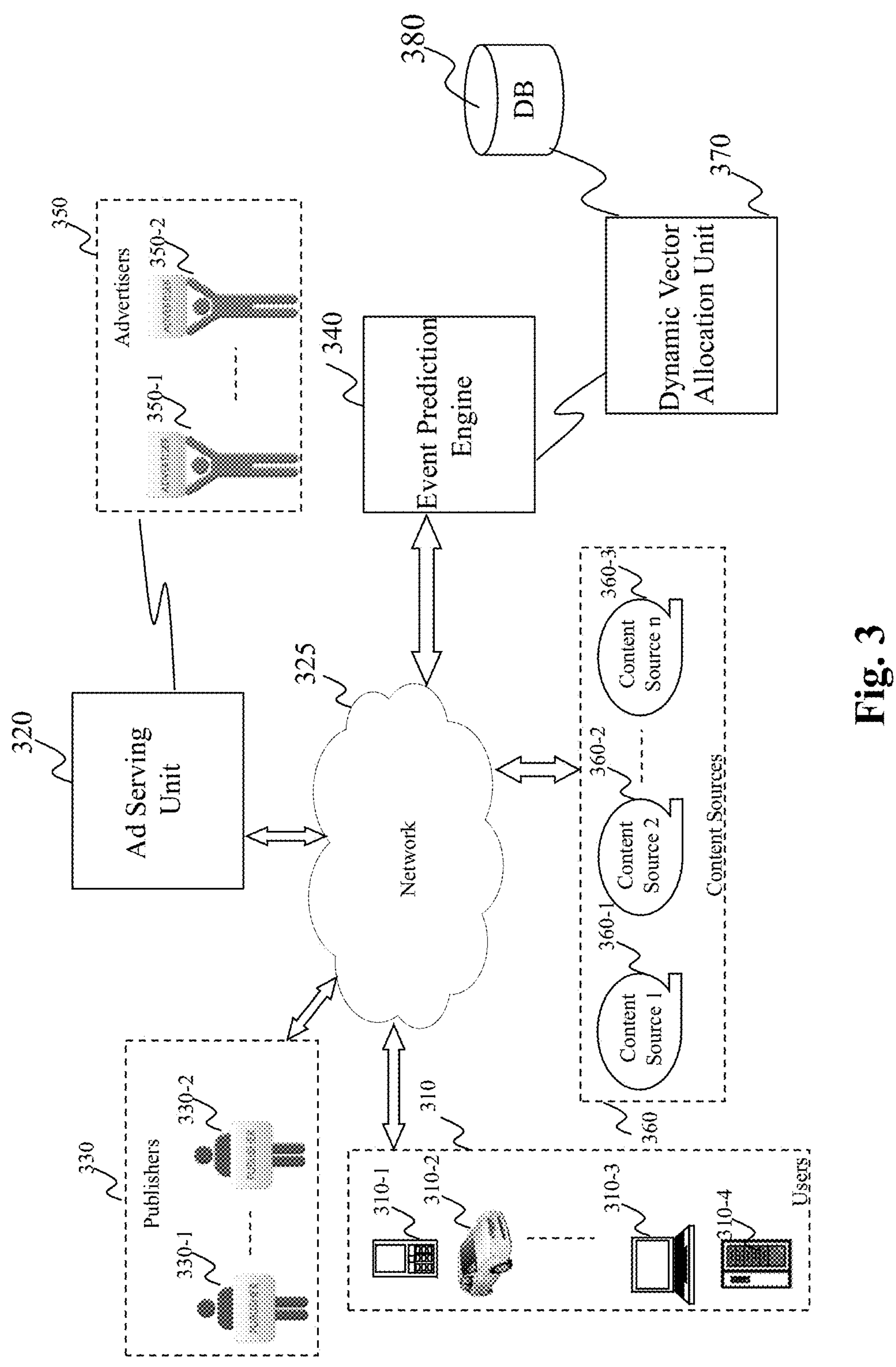
FIG. 3 illustrates an exemplary application of a dynamic vector allocation unit, according to an embodiment of the present teaching.

FIG. 3 is a high-level depiction of an exemplary networked environment including a dynamic vector allocation unit, according to an embodiment of the present teaching. The exemplary networked environment includes users 310, a network 325, publishers 330, an advertisement serving unit 320, advertisers 350, content sources 360, an event prediction engine 340, a dynamic vector allocation unit 370, and a database 380.

The network 325 in the networked environment may be a single network or a combination of different networks. For example, a network may be a local area network (LAN), a wide area network (WAN), a public network, a private network, a proprietary network, a Public Telephone Switched Network (PSTN), the Internet, a wireless network, or a virtual network, or any combination thereof. In one embodiment, the network 325 may be an online advertising network or an ad network, which connects advertisers 350 to publishers 330 or websites/mobile applications that want to host advertisements. A function of an ad network is aggregation of ad-space supply from publishers and matching it with advertiser demand. An ad network may be a television ad network, a print ad network, an online (Internet) ad network, or a mobile ad network.

Users 310 may be of different types such as users connected to the network via desktop connections (310-4), users connecting to the network via wireless connections such as through a laptop (310-3), a handheld mobile device (310-1), or a built-in device in a motor vehicle (310-2). In one embodiment, user(s) 310 may be connected to the network and able to access and interact with online content (provided by the publishers) through wireless technologies and related operating systems implemented within user-wearable devices (e.g., glasses, wrist watch, etc.). A user, e.g., the user 310-1, may send a request for online content to one of the publishers, e.g., 330-1, via the network 325 and receive content through the network 325.

Publishers 330 may correspond to an entity, whether an individual, a firm, or an organization, having publishing business, such as a television station, a newspaper issuer, a web page host, an online service provider, or a game server. For example, in connection to an online or mobile ad network, publishers 330-1 . . . 330-2 can be an organization such as USPTO.gov, a content provider such as CNN.com and Yahoo.com, or a content-feed source such as Twitter® or blogs. In one embodiment, publishers 330 include entities that develop, support and/or provide online content via mobile applications (e.g., installed on smartphones, tablet devices, etc.).

Referring to the above example, the content sent to user 310-1 may be generated by the publisher 330-1 based on the content sources 360. A content source may correspond to an entity where the content was originally generated and/or stored. For example, a novel may be originally printed in a magazine, but then posted online at a web site controlled by a publisher. The content sources 360 in the exemplary networked environment includes multiple content sources 360-2, . . . , 360-3.

An advertiser, e.g., 350-1, may correspond to an entity, whether an individual, a firm, or an organization, doing or planning to do (or otherwise involved in) advertising business. As such, an advertiser 350-1 may be an entity that provides product(s) and/or service(s), and itself handles the advertising process for its own product(s) and/or service(s) at a platform (e.g., websites, mobile applications, etc.) provided by a publisher. For example, advertisers 350-1 . . . 350-2 may include companies like General Motors®, Best Buy®, or Disney®. In some other cases, however, an advertiser 350-1 may be an entity that only handles the advertising process for product(s) and/or service(s) provided by another entity.

When content is sent to the user 310-1, one or more advertising opportunities may be available for one or more advertisements to be presented with the content to the user 310-1, on a same web page, via a same application, or in a same user session. For an available advertising opportunity, a request may be sent out to advertisers to solicit bids with respect to the advertising opportunity. The request can be sent out by the ad serving unit 320 that manages the publishers 330. The ad serving unit 320 may serve as a supply side platform (SSP) for selling one or more advertisement opportunities by soliciting bids from one or more demand side platforms (DSP) and selecting a winning bid among the bids received from the DSPs. The bid request may be sent out to one or more DSPs.

Advertisers 350 typically target the most receptive audiences with certain traits, based on the product the advertiser is promoting. These traits can either be demographic which are focused on race, economic status, sex, age, the level of education, income level and employment or they can be psychographic focused which are based on the consumer's values, personality, attitudes, opinions, lifestyles and interests. They can also be behavioral variables, such as browser history, purchase history, and other recent activity. Targeted advertising is focused on certain traits and the consumers who are likely to have a strong preference will receive the message instead of those who have no interest and whose preferences do not match a product's attribute. As such, the advertisers 350 can serve advertisements stored in an ad database to the most relevant audience.

By one example, in order for advertisers to obtain information related to a set of targeted audiences, an event prediction engine 340 may be utilized. By one embodiment, the event prediction engine 340 may be trained to obtain click predictions of users with respect to a particular type of advertisement. The advertisers 350 may use such information to determine what type of advertisements are to be provided. The event prediction engine 340 may be a click prediction model that is trained to evaluate each advertisement using historical data related to the advertisement. Specifically, the event prediction engine 340 may be trained based on user data i.e., user feature vectors that are dynamically allocated by the dynamic vector allocation unit 370 to the target vector. Furthermore, it must be appreciated that the event prediction engine may also be used by a DSP that is configured to select which advertiser's ad is to be provided based on the dynamic allocation. Details regarding the dynamic allocation are described next.

Figure 4:
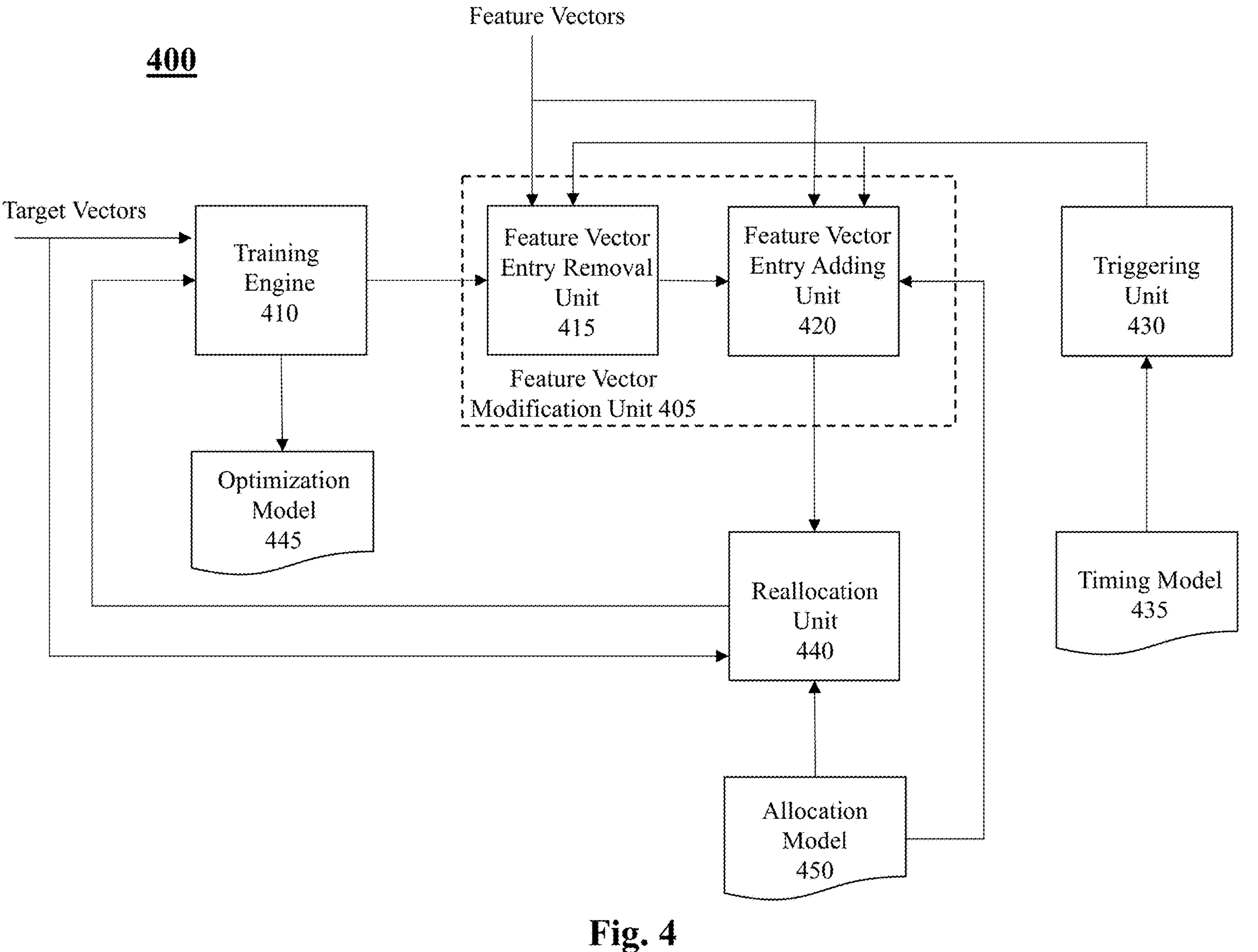
FIG. 4 illustrates a high level system diagram of a dynamic vector allocation unit, according to an embodiment of the present teaching.

FIG. 4 illustrates a high level system diagram of a dynamic vector allocation unit 400, according to an embodiment of the present teaching. The dynamic vector allocation unit 400 includes a training engine 410, a feature vector modification unit 405, a triggering unit 430, and a reallocation unit 440. The feature vector modification unit 405 includes a feature vector entry removal unit 415 and a feature vector entry adding unit 420.

In operation, the training engine 410 is configured to receive as input target vectors and train an optimization model 445 with respect to a particular optimization function. It must be appreciated that the optimization function may be problem specific based on the problem being solved. As stated previously, a function of the dynamic vector allocation unit 400 is to dynamically change the attributes of feature vectors (i.e., source vectors) that are mapped to the target vector. As such, by one embodiment of the present disclosure, during training, the feature vector modification unit 405 is configured to identify an entry of the target vector that is to be modified, i.e., identify a feature entry in the target vector that is to be modified. Upon identifying a particular entry, the corresponding attributes of feature vectors (source vectors) that are mapped to the particular target vector entry may be obtained. By one embodiment, the feature vector entry removal unit 415 is configured to replace at least one of the obtained attributes.

The feature vector entry adding unit 420 may replace the at least one obtained attribute with an alternative attribute from one or more alternative source vectors. The newly added attribute may be allocated to the feature entry of the target vector that is to be modified based on an allocation model 450. The reallocation unit 440 obtains the target vector and populates the feature entry of the target vector with the alternative attribute. The newly reallocated target vector is fed back to the training engine for training purposes. Specific details regarding the feature vector entry removal unit 415, the feature vector entry adding unit 420, and the reallocation techniques are described next.

By one embodiment of the present disclosure, the dynamic vector allocation unit 400 is configured to perform the functions of feature vector entry removal and addition at specific time instances. For example, the attribute removal and addition functions described above may be performed at a time instance corresponding to a start time of each training cycle (i.e., a batch of training data). Such a functionality can be achieved by a triggering unit 430 which activates the dynamic vector allocation unit 400 at the commencement of each training cycle to perform the above described functions. Moreover, it must be appreciated that the scope of the present disclosure is in no way limited to the time instances corresponding to the start of the training cycles. Rather, the triggering unit 430 may employ any timing model 435 to initiate the process of feature vector entry removal and addition.

Figure 5:
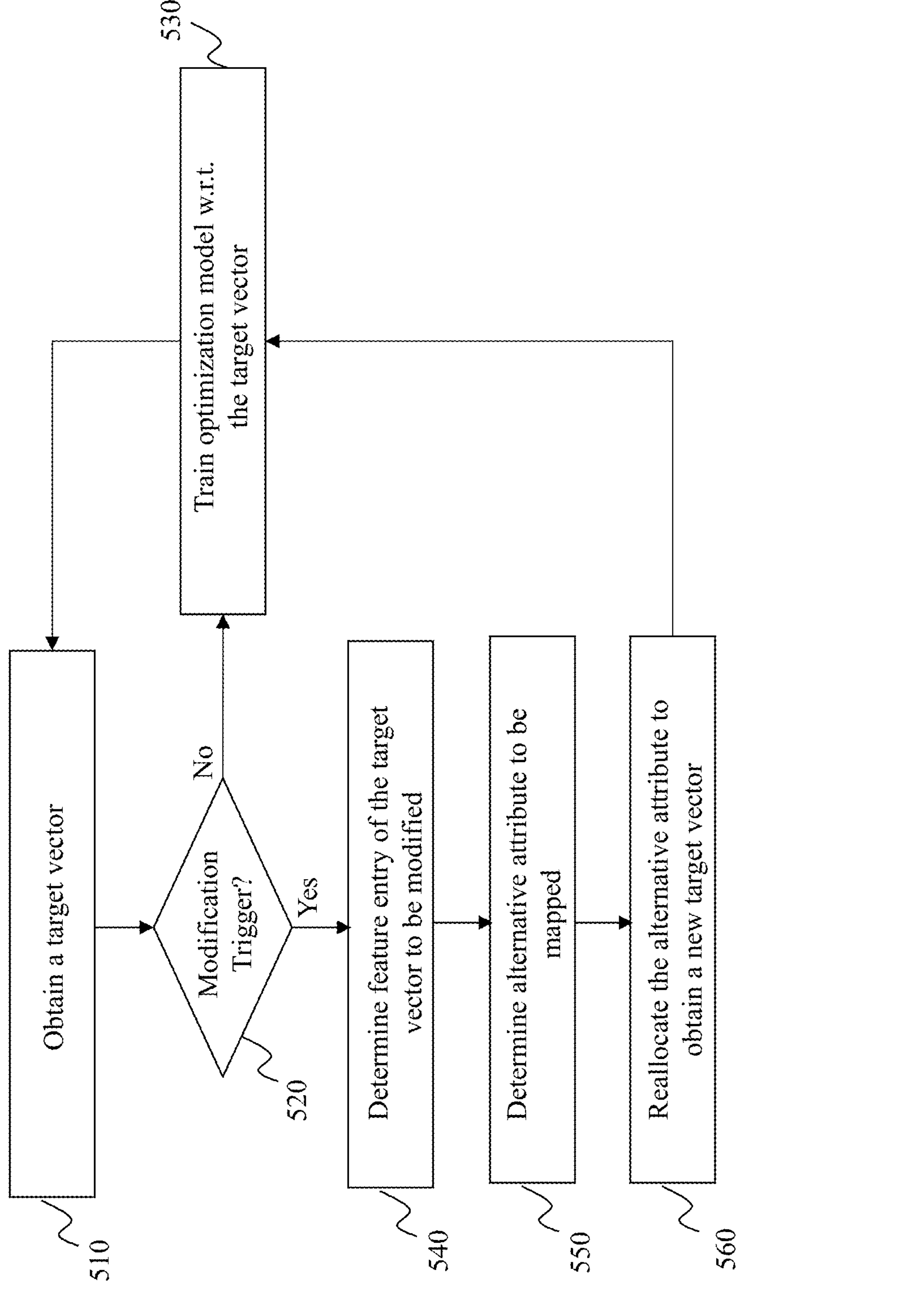
FIG. 5 depicts an illustrative flowchart of an exemplary process performed by a dynamic vector allocation unit, in accordance with various embodiments of the present teaching.

Turning now to FIG. 5, there is depicted an illustrative flowchart of an exemplary process performed by a dynamic vector allocation unit, in accordance with various embodiments of the present teaching. The process commences in step 510, wherein a target vector is obtained. In step 520, a query is performed to determine if a triggering signal is obtained. If the response to the query of step 520 is affirmative, the process moves to step 540. However, if the response to the query is negative, the process moves to step 530.

In step 530, the process continues to train the optimization model with respect to the target vector, where after the process loops back to step 510 to obtain the next target vector. In step 540, the process determines a feature entry of the target vector that is to be modified. Specifically, the process identifies a feature entry in the target vector, in accordance with a first criterion associated with an assessment of the machine learning, for replacing the corresponding at least one original attribute from the one or more original source vectors. In step 550, the process determines at least one alternative attribute from one or more alternative source vectors based on a condition (described later), wherein the at least one alternative attribute is to be mapped to the feature entry of the target vector. In step 560, the alternative attribute is populated in the target vector. Thereafter, the process loops back to step 530 to continue to train the optimization model with respect to the new target vector.

Figure 6:
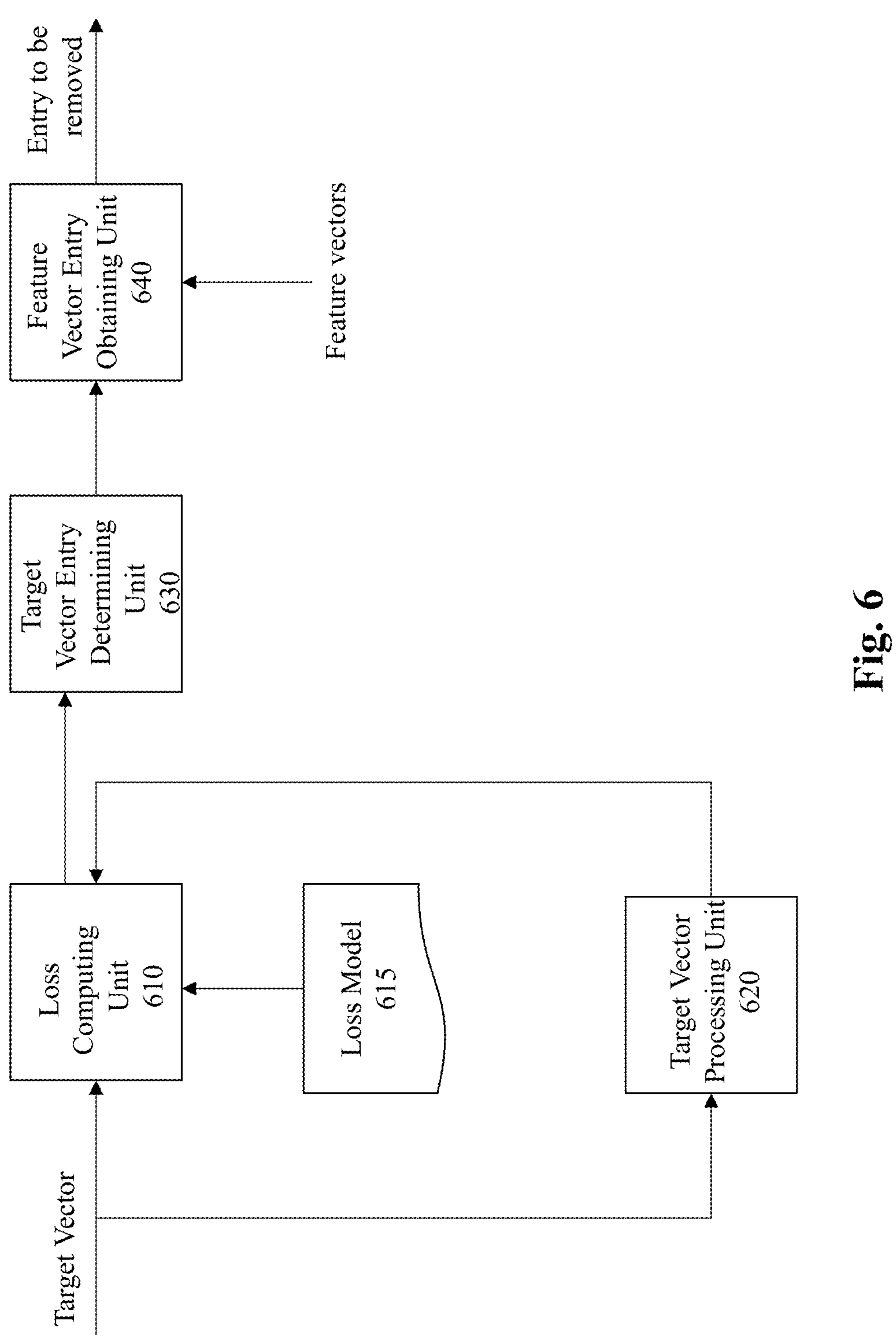
FIG. 6 illustrates a high level system diagram of a feature vector entry removal unit, according to an embodiment of the present teaching.

FIG. 6 illustrates a high level system diagram of a feature vector entry removal unit, according to an embodiment of the present teaching. The feature vector entry removal unit includes a loss computing unit 610, a target vector processing unit 620, a target vector entry determining unit 630, and a feature vector entry obtaining unit 640.

The loss computing unit 610 receives as input the target vector (for instance, a target vector including N entries) and computes a loss function of the target vector in accordance with a loss model 615. In other words, the loss computing unit computes: loss=$f$ (target vector). Further, the target vector is processed by the target vector processing unit 620 in an iterative manner. Specifically, the target vector processing unit 620 removes entry $e_i$ (i.e., the $i^{th}$ entry of the target vector) from the target vector and sends the processed target vector to the loss computing unit, which computes the loss as: loss=$f$ (target vector−$e_i$). In other words, the target vector processing unit 620 and the loss computing unit 610 compute a performance of a model that does not include the $i^{th}$ entry. It must be appreciated that the iterative process operates on all N entries of the target vector i.e., i=1 to N.

The target vector entry determining unit 630 is configured to identify a feature entry of the target vector that is to be modified. By one embodiment, the target vector entry determining unit 630 identifies the feature entry of the target vector to be modified based on a condition associated with the computed losses. For instance, the condition may correspond to the target vector entry determining unit 630 modifying the feature entry in the target vector that has the minimum amount of loss, i.e., argmin ($loss_i$). It must be appreciated that the feature entry in the target vector that is to be modified may correspond to the entry which has the maximum amount of loss. Upon determining the entry of the target vector that is to be modified, the feature vector entry obtaining unit 640 retrieves the attributes of source vectors, i.e., input feature vector(s) that are mapped to the determined feature entry of the target vector. As discussed previously, one of the retrieved attributes is replaced with an alternative attribute as described next.

Figure 7:
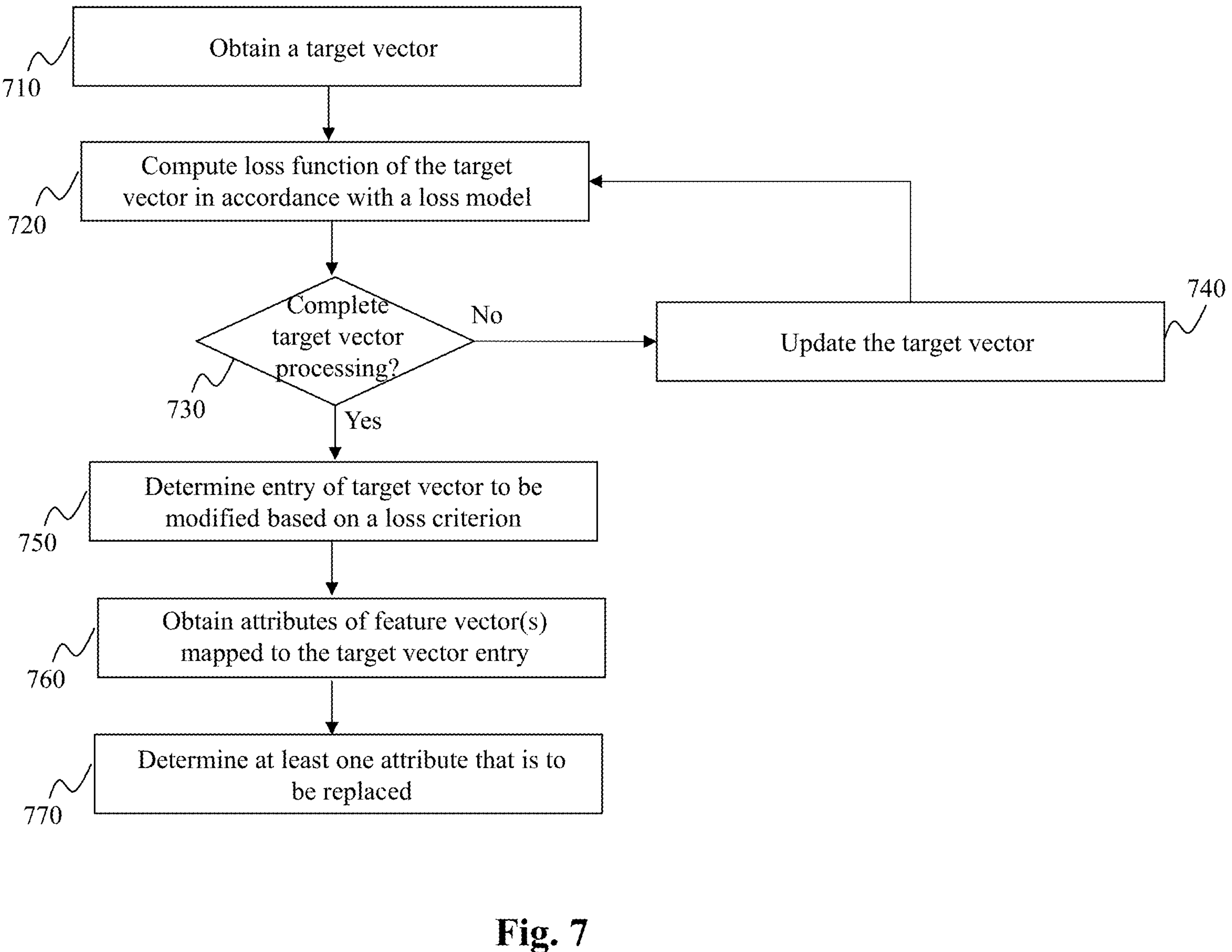
FIG. 7 depicts an illustrative flowchart of an exemplary process performed by a feature vector entry removal unit, in accordance with various embodiments of the present teaching.

FIG. 7 depicts an illustrative flowchart of an exemplary process performed by a feature vector entry removal unit, in accordance with various embodiments of the present teaching. The process commences in step 710 wherein a target vector is obtained. In step 720, a loss function of the target vector is computed in accordance with a loss model.

The process then moves to step 730 wherein a query is performed to determine whether processing of the target is complete. If the response to the query is negative, the process moves to step 740; if the response to the query is positive, the process moves to step 750. In step 740, the target vector is updated, whereafter the process loops back to step 720 to compute the loss function of the updated target vector. In other words, the process computes a performance of a model that does not include the $i^{th}$ entry as described previously.

Upon computing the loss functions of the target vector, in step 750, a particular feature entry of the target vector that is to be modified is determined based on a loss criterion. For example, the feature entry of the target vector that is to be modified may correspond to the entry which has the minimum loss function. Further, in step 760, attribute(s) of source/feature vectors that are mapped to the particular entry of target vector are obtained. In step 770, at least one attribute of the obtained attribute(s) is removed and replaced.

Figure 8:
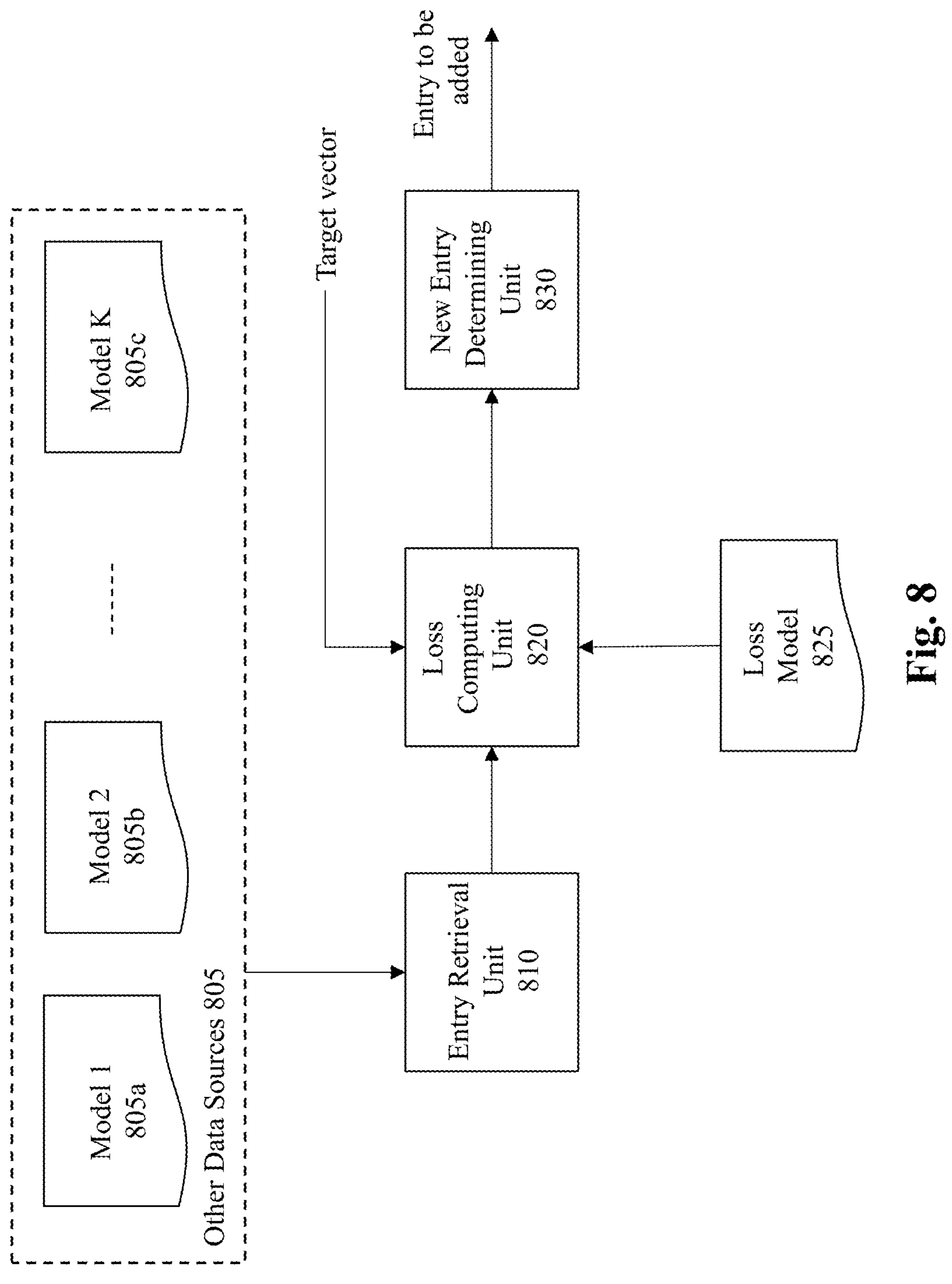
FIG. 8 illustrates a high level system diagram of a feature vector entry adding unit, according to an embodiment of the present teaching.

FIG. 8 illustrates a high level system diagram of a feature vector entry adding unit, according to an embodiment of the present teaching. In one instance, an independent unit that trains alongside the present model (i.e., the dynamic vector allocation unit) may be used to obtain an alternative attribute of a feature/source vector that is to be added to the present model. Specifically, the independent unit may grow a set of potential extra entries i.e., alternative attributes—one for each feature and for each pair of features. Each entry is trained independently as if it is a part of the model. Upon evaluation of a score e.g., a log loss for each of the entries, the entry to be added may be determined as described below.

The feature vector entry adding unit includes an entry retrieval unit 810, a loss computing unit 820, and a new entry determining unit 830. The entry retrieval unit 810 receives from other data sources 805, i.e., source vectors, potential attributes that may be added to the model. The other data sources 805 correspond to the independent unit that is trained alongside the dynamic vector allocation unit of the present disclosure. The independent unit 805 may include a plurality of other models 805*a*, 805*b*, . . . , 805*c* that are trained alongside the model of the present disclosure.

Upon retrieving an alternative attribute, the loss computing unit 820 computes, in accordance with a loss model 825, a loss function (e.g., log loss) for the model that includes the potential attribute. It must be appreciated that the loss function is computed for each potential replacement attribute. Upon computing the loss function for all the potential replacements, the new entry determining unit 830 selects one of the potential replacement attributes as the attribute to be added, which has the lowest log loss value.

Figure 9:
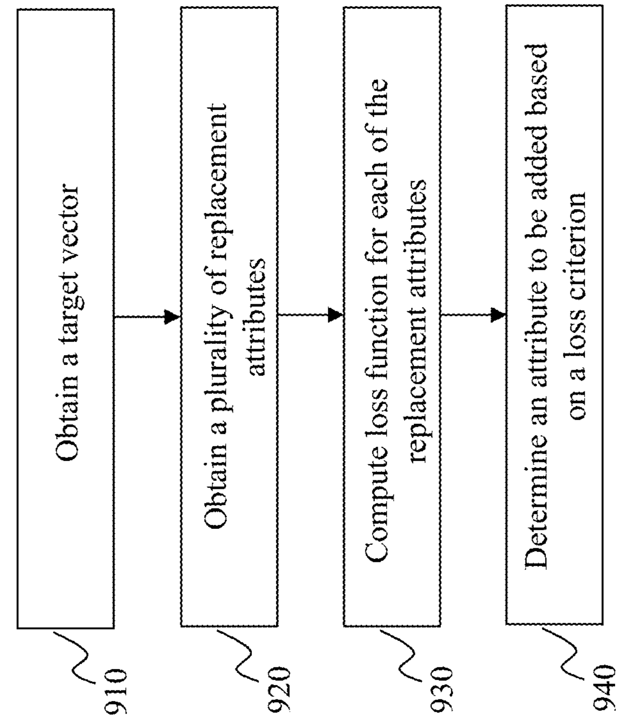
FIG. 9 depicts an illustrative flowchart of an exemplary process performed by a feature vector entry adding unit, in accordance with various embodiments of the present teaching.

FIG. 9 depicts an illustrative flowchart of an exemplary process performed by a feature vector entry adding unit, in accordance with various embodiments of the present teaching. The process commences in step 910, wherein a target vector is obtained. In step 920, a plurality of potential replacement attributes (also referred to as alternative attributes) are obtained. Further, in step 930, a loss function is computed for each of the potential replacement attributes, in accordance with a loss model. The process in step 940 selects one of the potential replacement attributes to be added based on a loss criterion. For example, the selected replacement is one which is associated with the lowest score, i.e., minimum log loss upon being populated to a feature entry of the target vector.

Figure 10A:
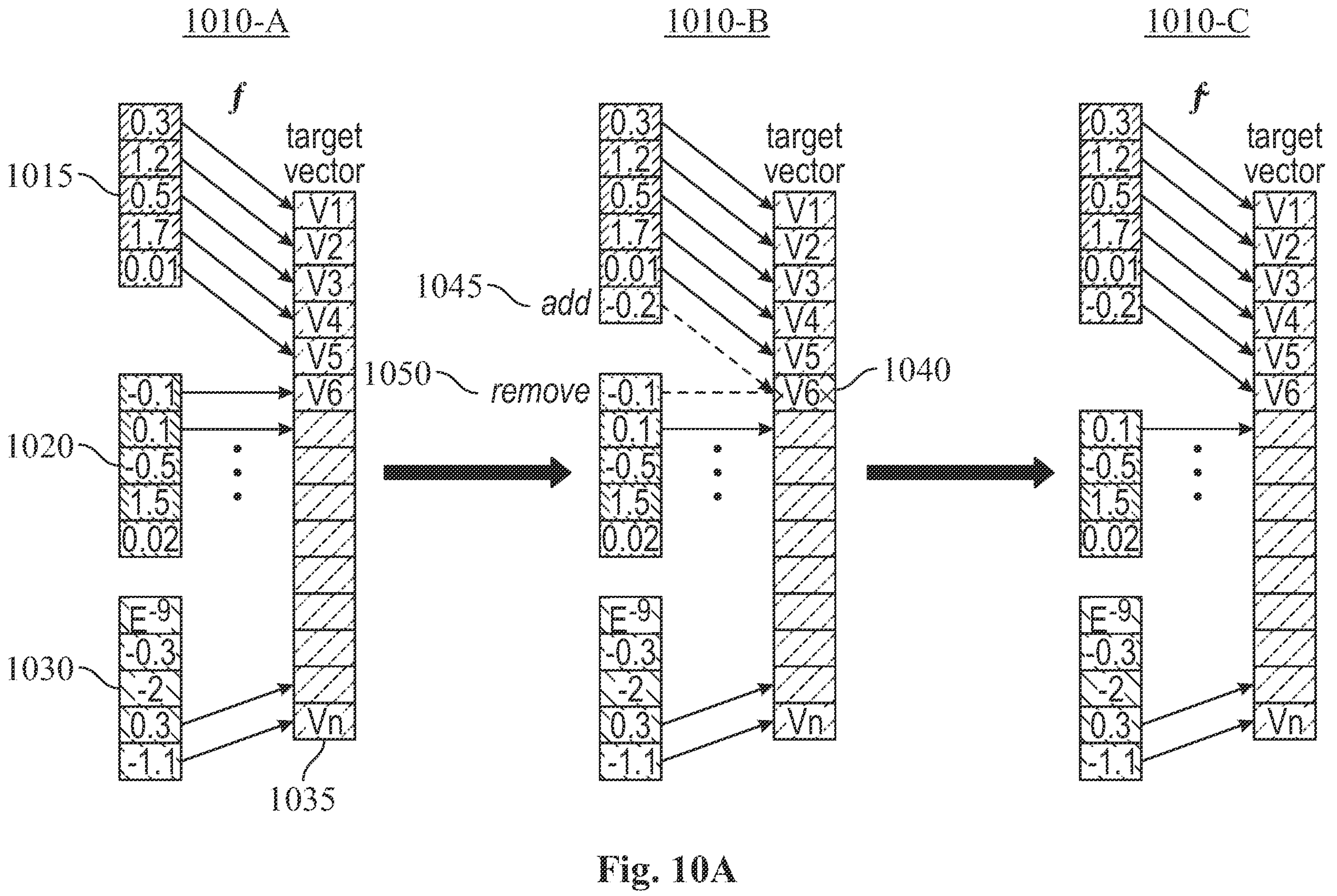
FIGS. 10A and 10B depict according to an embodiment exemplary scenarios illustrating removal/adding of a feature vector entry.
Figure 10B:
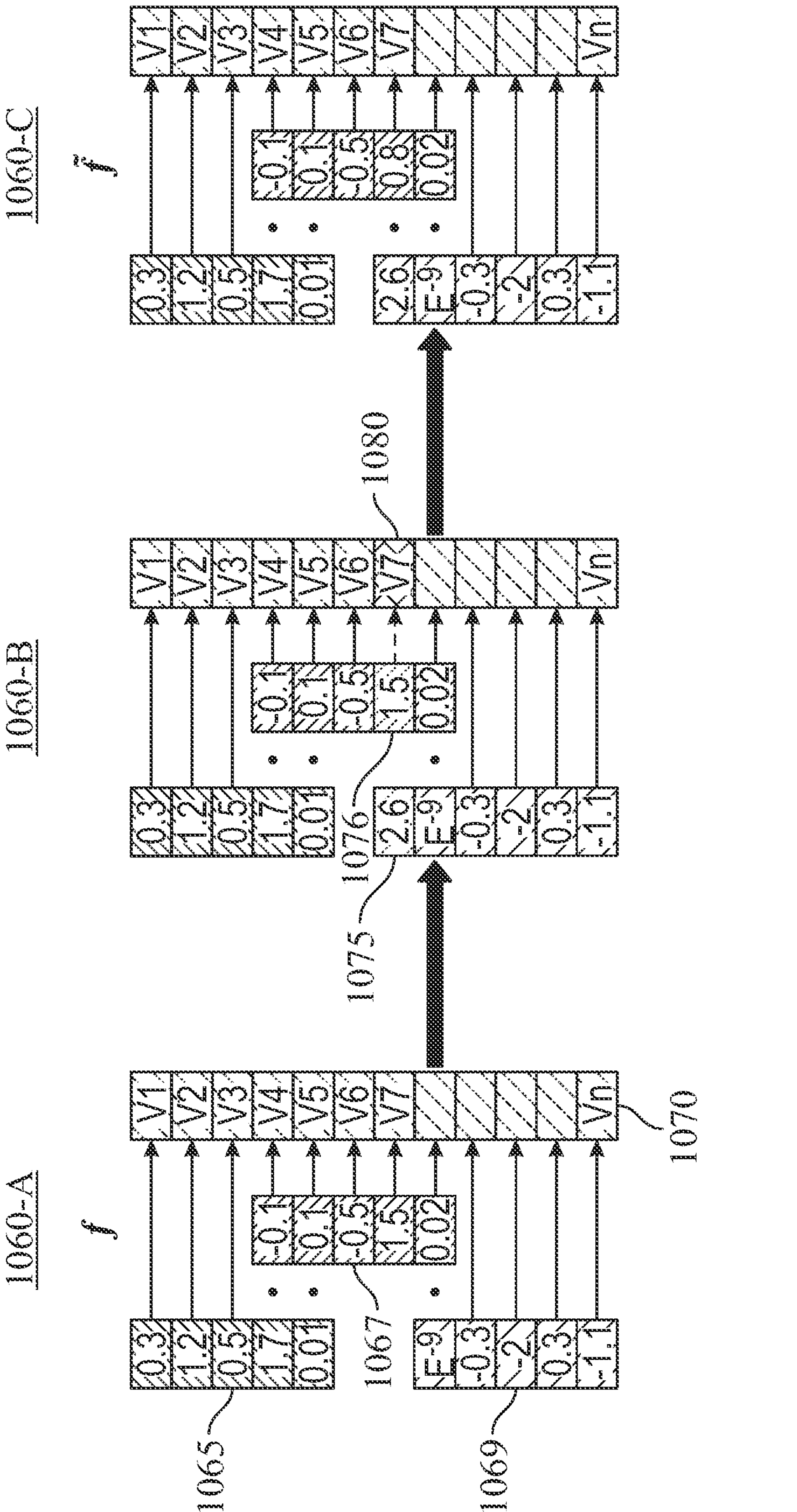

FIGS. 10A and 10B depict, according to an embodiment, exemplary scenarios illustrating removal/adding of a feature vector entry, i.e., attribute of a source/feature vector. Referring to FIG. 10A, 1010-A depicts a scenario wherein three feature vectors 1015, 1020, and 1030, respectively are mapped to a target vector 1035 including n entries labeled $V_1, V_2, \ldots, V_n$. In 1010-B, it is determined that the target vector entry $V_6$ is to be modified based on the log loss computations. As shown, the feature vector entry 1050 that is mapped to the target vector entry $V_6$ is obtained and removed. Subsequently, a new entry 1045 is added which maps to the entry $V_6$. It must be appreciated that in the example depicted in FIG. 10A, a feature vector entry from vector 1020 is removed and replaced with an entry belonging to vector 1015. In other words, the size of the vector 1015 is increased whereas the size of the vector 1020 is reduced. Such a situation may occur when the feature vector 1015 holds more informative value as compared to the feature vector 1020. The configuration upon reallocation of the newly added feature vector entry is depicted in scenario 1010-C. It must be appreciated that the newly added entry 1045 is not restricted to be selected from only the original feature vectors, but rather, may be selected from any alternative feature vector.

FIG. 10B depicts a scenario 1060-A, wherein three feature vectors 1065, 1067, and 1069, respectively are mapped to a target vector 1070, which includes n entries labeled $V_1, V_2, \ldots, V_n$. In this example, referring to 1060-B, the feature vector 1069 is expanded (i.e., an entry 1075 is added), and the target vector entry V7 1080 is assigned as a multiplication of two feature vector entries 1075 and 1076, respectively. Similar to FIG. 10A, the configuration upon reallocation of the newly added feature vector entry is depicted in scenario 1060-C.

Techniques described in the present disclosure provide for a dynamic manner of user feature vector allocation to a target vector. Different user features possess different informative value. Therefore, an accurate and delicate construction of the user vector may be highly beneficial. The dynamic vector allocation unit of the present disclosure detects weak entries that one would like to remove and enhances deprived features which may be more beneficial. As such, the dynamic vector allocation unit provides an improvement over typical user feature vector training engines in that during training the dynamic vector allocation unit tends to focus on the feature vectors which have more informative value and thereby drastically reduces training time of the learning engine as compared to typical user feature vector training engines.

Figure 11:
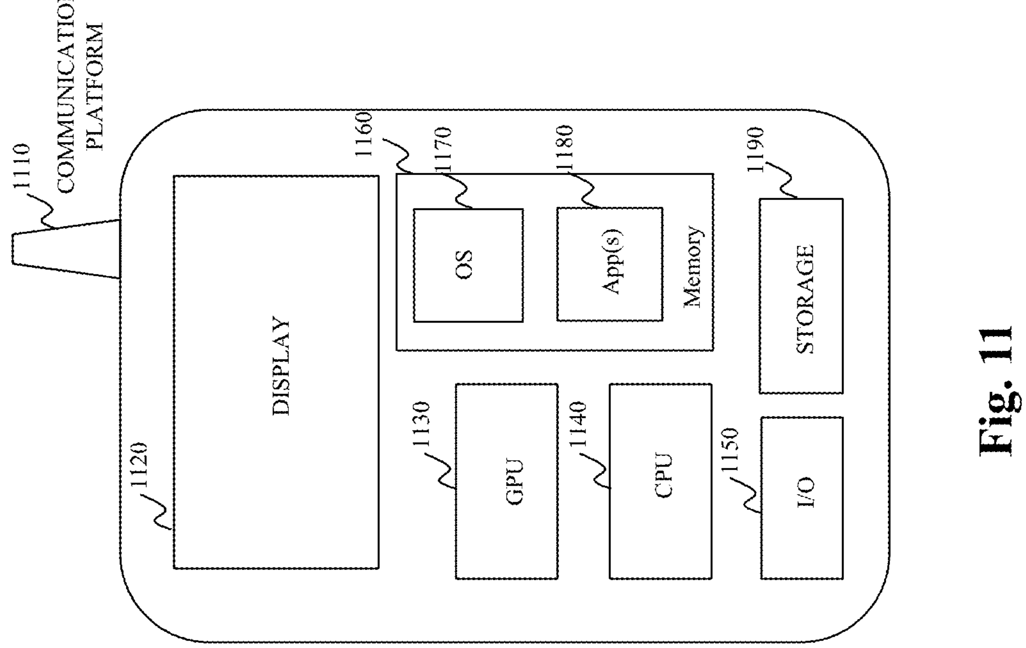
FIG. 11 depicts an architecture of a mobile device which can be used to implement a specialized system incorporating the present teaching.

Turning now to FIG. 11, there is depicted an architecture of a mobile device 1100, which can be used to realize a specialized system implementing the present teaching. In this example, a user device on which the functionalities of the various embodiments described herein can be implemented is a mobile device 1100, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1100 in this example includes one or more central processing units (CPUs) 1140, one or more graphic processing units (GPUs) 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170, e.g., iOS®, Android®, Windows Phone®, etc., and one or more applications 1180 may be loaded into the memory 1160 from the storage 1190 in order to be executed by the CPU 1140. The applications 1180 may include a browser or any other suitable mobile apps for performing the various functionalities on the mobile device 1100. User interactions with the content displayed on the display panel 1120 may be achieved via the I/O devices 1150.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 12:
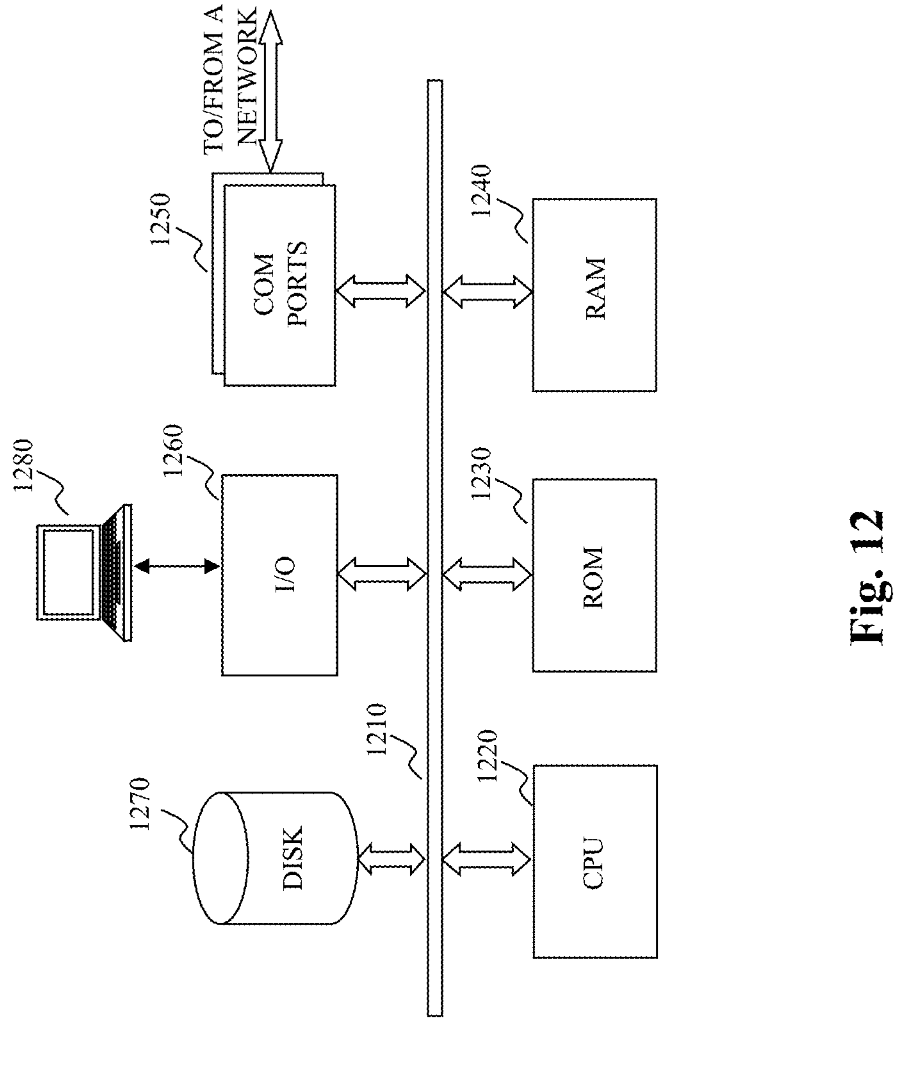
FIG. 12 depicts the architecture of a computer which can be used to implement a specialized system incorporating the present teaching.

FIG. 12 is an illustrative diagram of an exemplary computer system architecture, in accordance with various embodiments of the present teaching. Such a specialized system incorporating the present teaching has a functional block diagram illustration of a hardware platform which includes user interface elements. Computer 1200 may be a general-purpose computer or a special purpose computer. Both can be used to implement a specialized system for the present teaching. Computer 1200 may be used to implement any component(s) described herein. For example, the present teaching may be implemented on a computer such as computer 1200 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1200, for example, may include communication ports 1250 connected to and from a network connected thereto to facilitate data communications. Computer 1200 also includes a central processing unit (CPU) 1220, in the form of one or more processors, for executing program instructions. The exemplary computer platform may also include an internal communication bus 1210, program storage and data storage of different forms (e.g., disk 1270, read only memory (ROM) 1230, or random access memory (RAM) 1240), for various data files to be processed and/or communicated by computer 1200, as well as possibly program instructions to be executed by CPU 1220. Computer 1200 may also include an I/O component 1260 supporting input/output flows between the computer and other components therein such as user interface elements 1280. Computer 1200 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the dynamic vector allocation unit into the hardware platform(s) of a computing environment or other system implementing a computing environment or similar functionalities in connection with allocation. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the dynamic vector allocation unit, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for performance based dynamic vector construction via machine-training, the method comprising:

machine-training, by a training engine of a dynamic vector allocator implemented by a processor based on a target vector, a machine-trained model, wherein the target vector has a plurality of feature entries, wherein each of the plurality of feature entries is mapped from at least one attribute from at least first and second source vectors, and wherein a number of feature entries in the target vector associated with attributes from the first source vector is same as that in the target vector associated with attributes from the second source vector;

based on a timing model, activating, by a trigger of the dynamic vector allocator implemented by the processor, a feature vector modifier of the dynamic vector allocator to adjust, based on informative values of the first and second source vectors, the number of feature entries in the target vector corresponding to attributes from the first source vector and the number of feature entries in the target vector corresponding to attributes from the second source vector, by:

identifying, by the feature vector modifier of the dynamic vector allocator implemented by the processor, one of the feature entries in the target vector, in accordance with a first criterion via machine learning based on the machine-trained model, for replacing the corresponding at least one attribute from the first source vector;

determining, by the feature vector modifier of the dynamic vector allocator, at least one alternative attribute from the second source vector based on a second criterion, wherein the at least one alternative attribute is to be mapped to the feature entry of the target vector; and updating, by a reallocator of the dynamic vector allocator implemented by the processor, the target vector by populating the feature entry of the target vector based on the at least one alternative attribute, wherein the updating comprises changing the numbers of feature entries in the target vector associated with attributes respectively from the first source vector and from the second source vector so that a number of feature entries in the updated target vector associated with attributes from the first source vector is different from that associated with attributes from the second source vector;

feeding back, by the reallocator of the dynamic vector allocator, the updated target vector to the training engine of the dynamic vector allocator; and further machine-training, by the training engine of the dynamic vector allocator using the fed-back updated target vector, the machine-trained model to focus more on data associated with one of the first and second source vectors that holds more informative value than on data associated with the other one of the first and second source vectors that holds less informative value, thereby reducing a training time of the training engine compared to user feature vector training engines that consider the first and second source vectors to be equally important.

2. The method of claim 1, wherein the first source vector has less informative value than the second source vector, and the number of feature entries in the updated target vector associated with attributes from the first source vector is less than that associated with attributes from the second source vector.

3. The method of claim 1, wherein the machine learning is related to determining effectiveness of the plurality of feature entries in contributing to the machine learning.

4. The method of claim 1, wherein the first criterion corresponds to selecting the feature entry in the target vector that has a minimum loss value.

5. The method of claim 1, wherein the second criterion corresponds to selecting, from a plurality of alternative attributes, the at least one alternative attribute which incurs a minimum loss value upon being populated to the feature entry of the target vector.

6. The method of claim 1, wherein the first source vector partially overlaps with the second source vector.

7. The method of claim 1, wherein the feature entry of the target vector identified to be mapped using the at least one alternative attribute is assessed as not being effective in contributing to the machine learning.

8. A non-transitory machine-readable medium having information recorded thereon for performance based dynamic vector construction via machine-training, wherein the information, when read by a machine, causes the machine to perform the steps of:

machine-training, by a training engine of a dynamic vector allocator implemented by a processor based on a target vector, a machine-trained model, wherein the target vector has a plurality of feature entries, wherein each of the plurality of feature entries is mapped from at least one attribute from at least first and second source vectors, and wherein a number of feature entries in the target vector associated with attributes from the first source vector is same as that in the target vector associated with attributes from the second source vector;

based on a timing model, activating, by a trigger of the dynamic vector allocator implemented by the processor, a feature vector modifier of the dynamic vector allocator to adjust, based on informative values of the first and second source vectors, the number of feature entries in the target vector corresponding to attributes from the first source vector and the number of feature entries in the target vector corresponding to attributes from the second source vector, by:

identifying, by the feature vector modifier of the dynamic vector allocator implemented by the processor, one of the feature entries in the target vector, in accordance with a first criterion via machine learning based on the machine-trained model, for replacing the corresponding at least one attribute from the first source vector;

determining, by the feature vector modifier of the dynamic vector allocator, at least one alternative attribute from the second source vector based on a second criterion, wherein the at least one alternative attribute is to be mapped to the feature entry of the target vector; and updating, by a reallocator of the dynamic vector allocator implemented by the processor, the target vector by populating the feature entry of the target vector based on the at least one alternative attribute, wherein the updating comprises changing the numbers of feature entries in the target vector associated with attributes respectively from the first source vector and from the second source vector so that a number of feature entries in the updated target vector associated with attributes from the first source vector is different from that associated with attributes from the second source vector;

feeding back, by the reallocator of the dynamic vector allocator, the updated target vector to the training engine of the dynamic vector allocator; and further machine-training, by the training engine of the dynamic vector allocator using the fed-back updated target vector, the machine-trained model to focus more on data associated with one of the first and second source vectors than on data associated with the other one of the first and second source vectors that holds less informative value, thereby reducing a training time of the training engine compared to user feature vector training engines that consider the first and second source vectors to be equally important.

9. The medium of claim 8, wherein the first source vector has less informative value than the second source vector, and the number of feature entries in the updated target vector associated with attributes from the first source vector is less than that associated with attributes from the second source vector.

10. The medium of claim 8, wherein the machine learning is related to determining effectiveness of the plurality of feature entries in contributing to the machine learning.

11. The medium of claim 8, wherein the first criterion corresponds to selecting the feature entry in the target vector that has a minimum loss value.

12. The medium of claim 8, wherein the second criterion corresponds to selecting, from a plurality of alternative attributes, the at least one alternative attribute which incurs a minimum loss value upon being populated to the feature entry of the target vector.

13. The medium of claim 8, wherein the first source vector partially overlaps with the second source vector.

14. The medium of claim 8, wherein the feature entry of the target vector identified to be mapped using the at least one alternative attribute is assessed as not being effective in contributing to the machine learning.

15. A system for performance based dynamic vector construction via machine-training, the system comprising: a processor, and an engine implemented by the processor and configured to:

machine-train, by a training engine, based on a target vector, a machine-trained model, wherein the target vector has a plurality of feature entries, wherein the target vector has a plurality of feature entries, wherein each of the plurality of feature entries is mapped from at least one attribute from at least first and second source vectors, and wherein a number of feature entries in the target vector associated with attributes from the first source vector is same as that in the target vector associated with attributes from the second source vector;

based on a timing model, activate, by a trigger, a feature vector modifier to adjust, based on informative values of the first and second source vectors, the number of feature entries in the target vector corresponding to attributes from the first source vector and the number of feature entries in the target vector corresponding to attributes from the second source vector, by:

identifying one of the feature entries in the target vector, in accordance with a first criterion via the machine learning based on the machine-trained model, for replacing the corresponding at least one attribute from the first source vector;

determining at least one alternative attribute from the second source vector based on a second criterion, wherein the at least one alternative attribute is to be mapped to the feature entry of the target vector; and updating the target vector by populating the feature entry of the target vector based on the at least one alternative attribute, wherein the updating comprises changing the numbers of feature entries in the target vector associated with attributes respectively from the first source vector and from the second source vector so that a number of feature entries in the updated target vector associated with attributes from the first source vector is different from that associated with attributes from the second source vector;

feeding back the updated target vector to the training engine; and further machine-training, by the training engine using the fed-back updated target vector, the machine-trained model to focus more on data associated with one of the first and second source vectors that holds more informative value than on data associated with the other one of the first and second source vectors that holds less informative value, thereby reducing a training time of the training engine compared to user feature vector training engines that consider the first and second source vectors to be equally important.

16. The system of claim 15, wherein the first source vector has less informative value than the original source vector, and the number of feature entries in the updated target vector associated with attributes from the first source vector is less than that associated with attributes from the second source vector.

17. The system of claim 15, wherein the first criterion corresponds to selecting the feature entry in the target vector that has a minimum loss value.

18. The system of claim 15, wherein the second criterion corresponds to selecting, from a plurality of alternative attributes, the at least one alternative attribute which incurs a minimum loss value upon being populated to the feature entry of the target vector.

19. The system of claim 15, wherein the first source vector partially overlaps with the second source vector.

20. The system of claim 15, wherein the feature entry of the target vector identified to be mapped using the at least one alternative attribute is assessed as not being effective in contributing to the machine learning.

* * * * *